US009578517B2

(12) United States Patent
De Pasquale et al.

(10) Patent No.: US 9,578,517 B2
(45) Date of Patent: Feb. 21, 2017

(54) FULL SPECTRUM SHARING

(71) Applicant: Vodafone IP Licensing Limited, Newbury, Berkshire (GB)

(72) Inventors: Andrea De Pasquale, Madrid (ES); Francisco Javier Dominguez Romero, Madrid (ES); Brendan McWilliams, Madrid (ES)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 107 days.

(21) Appl. No.: 14/497,710

(22) Filed: Sep. 26, 2014

(65) Prior Publication Data
US 2015/0092544 A1    Apr. 2, 2015

(30) Foreign Application Priority Data

Sep. 27, 2013 (ES) .................................. 201331410

(51) Int. Cl.
*H04Q 7/00* (2006.01)
*H04W 16/14* (2009.01)
*H04W 28/24* (2009.01)

(52) U.S. Cl.
CPC ............. *H04W 16/14* (2013.01); *H04W 28/24* (2013.01)

(58) Field of Classification Search
CPC .. H04W 16/14; H04W 28/14; H04W 28/0284; H04W 28/24
USPC ................................ 370/329, 330, 328, 230
See application file for complete search history.

(56) References Cited

U.S. PATENT DOCUMENTS

| | | | |
|---|---|---|---|
| 2009/0191906 A1* | 7/2009 | Abedi | H04W 16/14 455/501 |
| 2010/0222065 A1* | 9/2010 | De Pasquale | H04W 16/14 455/450 |
| 2011/0077015 A1 | 3/2011 | Saily et al. | |
| 2012/0202549 A1* | 8/2012 | Eriksson | H04W 28/16 455/513 |
| 2012/0230195 A1* | 9/2012 | Khivesara | H04L 12/1881 370/235 |
| 2014/0080535 A1* | 3/2014 | Gauvreau | H04W 16/14 455/513 |

FOREIGN PATENT DOCUMENTS

WO    WO2012/072119    6/2002

OTHER PUBLICATIONS

Spanish Search Report for 201331410 dated Sep. 27, 2013.

* cited by examiner

*Primary Examiner* — Chuong T Ho
(74) *Attorney, Agent, or Firm* — Workman Nydegger (57) ABSTRACT

Coordination of the use of radio resource between a first Radio Access Network (RAN) and a second RAN is provided, each RAN being configured to communicate over the same predefined bandwidth range. A first priority associated with traffic to be carried over the first RAN and a second priority associated with traffic to be carried over the second RAN are determined. A first portion of the radio resource comprising one or more first bandwidth segments is assigned to the first RAN and a second portion of the radio resource comprising a plurality of second bandwidth segments is assigned to the second RAN, based on the first and second priorities. The first portion is indicated to a first RAN scheduler and/or the second portion is indicated to a second RAN scheduler. At least one first bandwidth segment is assigned between two of the second bandwidth segments.

17 Claims, 8 Drawing Sheets

FULL SPECTRUM SHARING

CROSS REFERENCE TO RELATED APPLICATION

This application claims priority to Spanish Application Number 201331410, filed on Sep. 27, 2013, the entirety of which is incorporated herein by reference.

TECHNICAL FIELD OF THE INVENTION

The invention concerns network element and a method for coordinating use of radio resource between a plurality of Radio Access Networks.

BACKGROUND TO THE INVENTION

Wireless networks, particularly radio access networks, are configured to operate within specific frequency ranges. To mitigate interference problems, an operator of a radio access network (RAN) is licensed for its use in specific bandwidth ranges. The license often restricts the Radio Access Technology (RAT) that may be used. For example, older RATs (such as Global System for Mobile Communications (GSM) and General Packet Radio Service (GPRS)) have conventionally been allocated in frequency bandwidths around 1800 MHz. It is increasingly desirable to operate RANs with a different RAT, such as Long Term Evolution (LTE), in the same bandwidth ranges as those in which RANs with such older RATs are operating. The spectrum can be split between the two RATs in a fixed manner in order to avoid significant interference between the two systems. Such a fixed share is not efficient however, since traffic varies significantly over time. There will be times when the load on one RAN is greater than the other and vice versa.

Figure 1A:
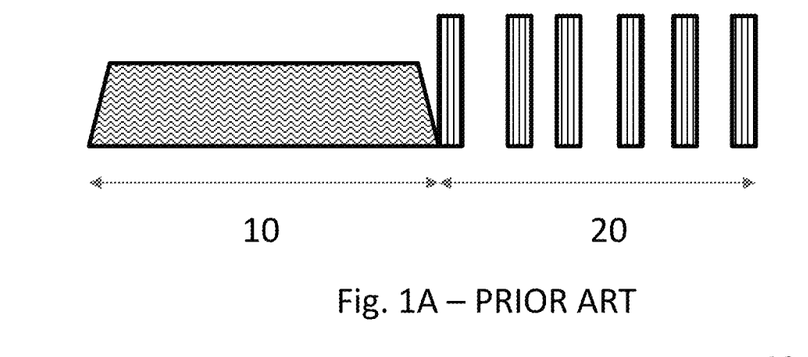
FIG. 1A shows a schematic diagram of an example spectral allocation according to the known approach of Dynamic Spectrum Sharing (DSS)

Desirably therefore, spectrum is shared between the two RANs. The proportion of the spectrum used by each RAN can be varied over time. One approach for achieving this is known as Dynamic Spectrum Sharing (DSS), in which a first portion of a bandwidth range is allocated to a first RAN and a second portion, contiguous (adjacent) with the first portion, is allocated to a second RAN. Both portions together form a single continuous bandwidth range. Referring to FIG. 1A, a schematic diagram showing an example spectral allocation according to the known approach of DSS is shown. Here, the first portion of spectrum 10 is allocated to LTE and the second portion of the spectrum 20 is allocated to GSM. These portions can be dynamically adjusted on the basis of the level of traffic being carried by each RAN.

Figure 1B:
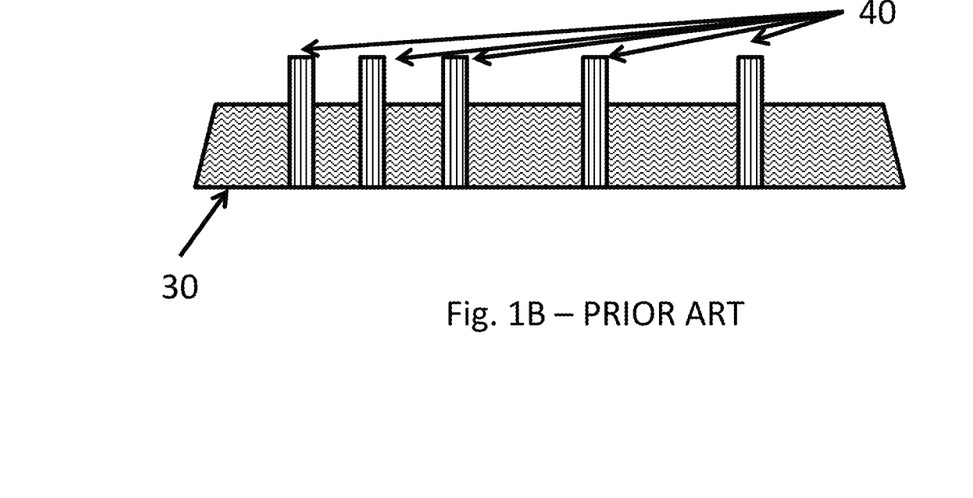
FIG. 1B shows a schematic diagram showing an example spectral allocation according to the known approach of Full Spectrum Sharing (FSS)

In an alternative approach, a GERAN is allocated one or more specific frequency segments within a bandwidth range, which may be contiguous or non-contiguous. Then, an LTE RAN is allocated all of the remainder of the bandwidth range that is not occupied by the GERAN. As the GERAN allocation is varied, the LTE RAN allocation changes accordingly. This approach can be termed Full Spectrum Sharing (FSS). Referring to FIG. 1B, a schematic diagram showing an example spectral allocation according to the known approach of FSS is shown. Here, the first portion of spectrum 30 is allocated to LTE and the second portion of the spectrum 40 is allocated to GSM. LTE is not scheduled frequencies occupied (used) by GSM traffic 40. It is potentially more efficient, since the LTE RAN may be provided with a full carrier for the entire bandwidth range. In contrast, only a fraction of the bandwidth range could be used by the LTE RAN under DSS.

Techniques based on DSS, FSS or both are described in European Patent publication No. EP2203011, having common ownership with this invention, and in International (PCT) Patent Publication No. WO-2010/091713. Allocations to each RAN under FSS can be made on the basis of each network's load, as for DSS. This allows load balancing. Nevertheless, improvements to load balancing in FSS remain a challenge.

SUMMARY OF THE INVENTION

Against this background, the present invention provides a network element for coordinating use of radio resource between a first radio access network (RAN) and a second RAN, wherein each RAN is configured to communicate over the same predefined bandwidth range. The network element comprises: logic, arranged to determine a first priority associated with a first traffic to be carried over the first RAN and to determine a second priority associated with a second traffic to be carried over the second RAN and further arranged to assign to the first RAN a first portion of the radio resource comprising one or more first bandwidth segments and to assign to a second RAN a second portion of the radio resource comprising a plurality of second bandwidth segments, the assignment of the first and second portions being based on the first and second priorities; and an output, configured to communicate an indication of the first portion to a scheduler of the first RAN and/or to communicate an indication of the second portion to a scheduler of the second RAN. The logic is further arranged to assign at least one of the one or more first bandwidth segments between two of the plurality of second bandwidth segments.

Thus, the network element is configured to implement an FSS approach. FSS beneficially allows changes to the spectrum allocation more easily than DSS, which cannot be easily done without service interruption and some traffic pre-emption (that is, handover of the traffic to other frequencies and then handover back once the reconfiguration is complete). This is partly because DSS requires changing the spectrum allocation in a cluster of neighbour cells by reconfiguring Power Amplifiers (PAs), thereby causing a downtime in service on both RANs of possibly a few seconds. The logic typically comprises or is digital logic.

The network element may be known as a coordinator, as it may coordinate between the two RANs. It does this using a respective priority associated with the traffic being carried by each RAN. The priority of the traffic is distinct from the load of the traffic, although in some cases, the priority may be a function of the load in combination with at least one other factor. These priorities are then used to determine the bandwidth allocation. The use of priorities allows the network operator to target radio resources more effectively and achieve higher quality of service thereby. Some examples of this will be discussed below.

The one or more first bandwidth segments may be a plurality of first bandwidth segments, which are advantageously non-contiguous. Similarly, the plurality of second bandwidth segments may also be non-contiguous.

The network element may also comprise and/or interact with one or more schedulers. The radio resource comprises bandwidth and timeslots. As detailed above, each RAN is assigned one or more (preferably, a plurality of) (optionally, non-contiguous) bandwidth segments. This may include at least one (preferably at least some and more preferably all) time slots within a specified time period. In this context, non-contiguous bandwidth segments mean there is at least one gap in the frequency domain between the bandwidth segments allocated to each RAN. Moreover, at least one of the bandwidth segments allocated to one RAN is in the gap between bandwidth segments allocated to the other RAN.

The first and second portions of the radio resource are beneficially non-overlapping (such that all time slots in the allocated bandwidth segments are assigned to the same RAN). Alternatively, a first fraction of time slots (which in some cases may be zero) in each bandwidth segment are allocated to the first RAN and a second fraction of time slots (which in some cases may be zero) in each bandwidth segment are allocated to the second RAN.

Preferably, the logic is arranged to assign the plurality of first bandwidth segments to interleave between the plurality of second bandwidth segments. For example, where the first RAN is a GERAN and the second RAN uses LTE RAT, the bandwidth segments allocated to the LTE RAN can fill in the gaps between those bandwidth segments allocated to the GERAN. GERAN traffic can be quite variable, so on a specific moment in time, not all assigned bandwidth segments may be occupied.

Advantageously, the first priority and the second priority indicate a Quality of Service (QoS) characteristic of the respective traffic. Each radio bearer may have one or more QoS parameters set. These may themselves indicate a priority, as will be explained below. For example, the QoS characteristic may include a minimum bit rate, maximum bit rate, delay requirement, application type (for instance, speech or others) or similar. Preferably, the first priority and the second priority are determined on the basis of one or more of: whether the respective traffic is circuit switched (CS) or packet switched (PS); the application for which the respective traffic is intended; the priority allocated to a mobile subscriber to which the respective traffic relates or the group of users to which this subscriber belongs; one or more parameters of the respective traffic; a Traffic Class of the respective traffic; and the radio access technology (RAT) used by the RAN for communication of the respective traffic. A combination of two or more of these parameters can be used in some embodiments to determine a respective priority for each RAN. Beneficially, the application for which the traffic is intended or the class of traffic is determined by Deep Packet Inspection (DPI) of the traffic. DPI is a method for reading live data traffic streams. This may allow an analysis of the type of application being used (for example, streaming, VoIP, web-browsing or similar) or class of traffic (such as conversational, streaming, interactive or background). The priority allocated to the mobile subscriber may be used in determining which radio resources are considered available on a specific RAT and at a specific point in time for scheduling transmissions to that subscriber. In addition, this priority may further indicate a more optimal capacity balance between the different RANs.

Additionally or alternatively, the application for which the traffic is intended may comprise one or more of: voice; video; peer-to-peer data; and hypertext transfer protocol (HTTP). In these cases, the traffic intended for voice or real time video applications may have a higher priority than traffic intended for video streaming, instant messaging, e-mail, HTTP or peer-to-peer data applications.

Preferably, the class of the traffic may comprise one or more of the four types of Traffic Class (such as defined by 3GPP): background; interactive; streaming; and conversational. For example, the QoS of the voice traffic is marked with Traffic Class Conversational. Packet Switched (PS) Interactive/Background Traffic Class traffic may have parameters such as Allocation and Retention Priority/Traffic Handling Priority (ARP/THP) or QoS Class Identifier (QCI), indicating the relative priority with respect to other PS Interactive/Background Traffic Class traffic. Then, traffic having a conversational Traffic Class may have a higher priority than traffic having a background or interactive Traffic Class. Traffic having a streaming Traffic Class may have a higher priority than traffic having a background or interactive Traffic Class. Additionally or alternatively, traffic of conversation Traffic Class may have a higher priority than traffic having a streaming Traffic Class. In embodiments, traffic having a background Traffic Class may have a lower priority than traffic having a interactive Traffic Class. Voice and/or video conversational traffic may be determined as highest priority traffic. In some scenarios, the RAT may also be taken into account, such that voice traffic over GERAN may be determined as higher priority than voice over LTE, for instance.

In preferred embodiments, the first portion and second portion will sum together to comprise the whole radio resource. Other embodiments may provide that the first portion and second portion sum together to comprise a fraction of the radio resource. For example, there may be a third RAN and this may be assigned a third portion of the radio resource. Optionally, the logic is further configured to determine a third priority associated with a third traffic to be carried over the third RAN. Then, it may be further configured to assign to the third RAN a third portion of the radio resource. This assignment may be based on the first, second and third priorities. The first portion, second portion and third portion may sum together to comprise the whole radio resource. In embodiments, the third portion of the radio resource comprises a one or more (preferably, a plurality of) third (optionally, non-contiguous) bandwidth segments. In cases, the output may be further configured to communicate an indication of the third portion to a scheduler of the third RAN.

Although priority of the traffic is used to allocate radio resources, other characteristics can additionally be used in embodiments. For example, the logic may be further arranged to determine a load on the first RAN and a load on the second RAN and to assign the first and second portions of the bandwidth based on the load on the first RAN and the load on the second RAN. Advantageously, the determined load on the first RAN relates only to the first traffic. Beneficially, the determined load on the second RAN relates only to the second traffic. It is possible for the first RAN to be carrying more than one type of traffic. In some embodiments, the allocation of radio resources may be based upon the load of traffic for which the priority has been determined.

Optionally, the output is configured to communicate the indication of the first and/or second portions of the radio resource by generating respective messages to the scheduler of the first RAN and/or to the scheduler of the second RAN. In the preferred embodiment, the output is configured to communicate the indication of the first and/or second portions of the radio resource using an interface between a first network entity associated with the first RAN and a second network entity associated with the second RAN. This interface may be used for other messages or it may be dedicated for coordination messages. Preferably, the first network entity is a base station controller (BSC) or a base transceiver station (BTS). Additionally or alternatively, the second network entity is an eNodeB. The first network entity and the second entity may be located at the same site. The coordinator, scheduler or a combination of the two may be responsible for allocating transmission power, processing resources, transmission resources, reception resources and similar as well.

In the preferred embodiment, the first RAN is a GSM or GPRS network (GERAN). Additionally or alternatively, the second RAN is a long term evolution (LTE) network. However, this may be reversed. Moreover, other types of RAN (with different Radio Access Technologies) may be used.

Advantageously, the first RAN and the second RAN are associated with the same network operator. Alternatively, the first RAN and the second RAN may be associated with different network operators, especially when their traffic is allowed to use the same radio resources, for example with a Mobile Virtual Network Operator (MVNO) or with an operator actively sharing the networks with a Multi-Operator Core Network (MOCN) feature.

In some embodiments, the network element forms part of the first RAN or part of the second RAN and in particular, it may form at least part of a network entity of the respective RAN. Advantageously, the network element may be co-located with an element acting as the scheduler of the first RAN or co-located with an element acting as the scheduler of the second RAN. Alternatively, the network element may be separate from the first RAN and second RAN.

In a second aspect, there is provided a method for coordinating use of radio resource between a first radio access network (RAN) and a second RAN, wherein each RAN is configured to communicate over the same pre-defined bandwidth range. The method comprises: determining a first priority associated with a first traffic to be carried over the first RAN; determining a second priority associated with a second traffic to be carried over the second RAN; assigning to the first RAN a first portion of the radio resource comprising one or more first bandwidth segments based on the first and second priorities; assigning to the second RAN a second portion of the radio resource comprising a plurality of second bandwidth segments based on the first and second priorities; and communicating an indication of the first portion to a scheduler of the first RAN and/or an indication of the second portion to a scheduler of the second RAN. At least one of the one or more first bandwidth segments is assigned between two of the plurality of second bandwidth segments.

It will be understood that any of the features described herein in connection with the network element can equally be provided as steps in the method of the second aspect. Beneficially, the present invention also provides a computer program configured when operated by a processor to form the method of the second aspect.

Any combination of the features described in connection with either the first or second aspect is also provided, even if not explicitly disclosed.

BRIEF DESCRIPTION OF THE DRAWINGS

The invention may be put into practice in various ways, one of which will now be described by way of example only and with reference to the accompanying drawings in which.

DETAILED DESCRIPTION OF A PREFERRED EMBODIMENT

Figure 2:
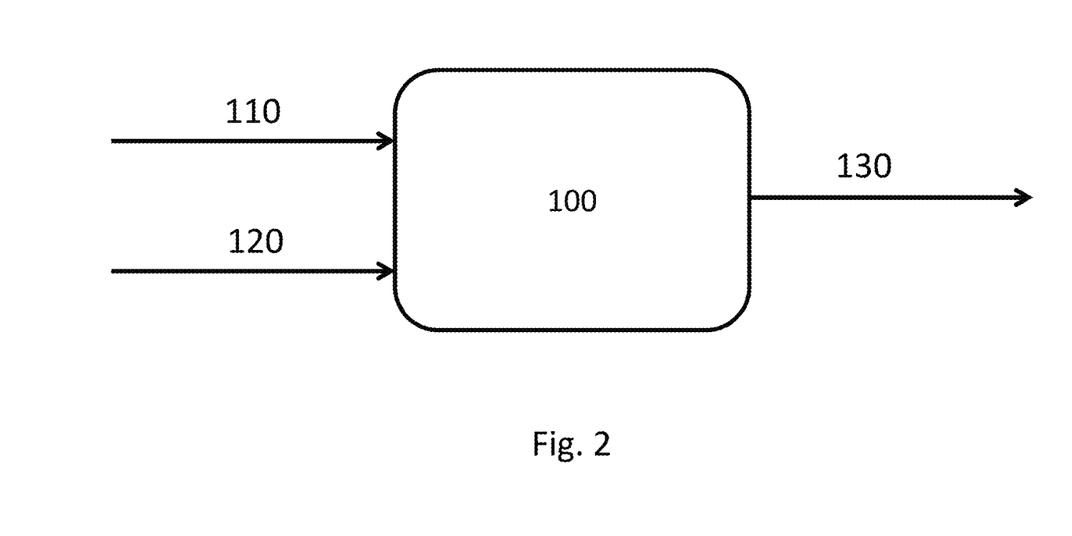
FIG. 2 depicts a network element in accordance with the present invention.

Referring first to FIG. 2, there is shown a network element in accordance with the present invention. The network element 100 may also be referred to as a coordinator. It receives a first input 110, which comprises information regarding a first traffic to be carried over a first RAN and a second input 120, which comprises information regarding a second traffic to be carried over a second RAN. The information may be a priority of the respective traffic. Alternatively, it may be information that may be used to determine a priority for the respective traffic.

Once the coordinator 100 has determined a first priority in relation to the first traffic and a second priority in relation to the second traffic (either by receiving these priorities using the first input 110 and second input 120 or by determining the priorities based on information provided by these two inputs), it uses these priorities to assign a first portion of the radio resource to the first RAN and a second portion of the radio resource to the second RAN. The coordinator 100 also comprises an output 130. This communicates an indication of the first portion to a scheduler of first RAN, or it communicates an indication of the second portion to a scheduler of the second RAN, or both.

The coordinator 100 assigns the available resources (for example, timeslots and/or frequencies) that will be used by the schedulers to schedule the traffic among the different packets or users at intervals defined by events and/or periodically. The priorities used may be fully configurable by the operator. The coordinator 100 thereby effects Shared Resource Management. This is made possible by the common knowledge of resource utilizations (carriers and time slots) in both RANs.

Figure 3:
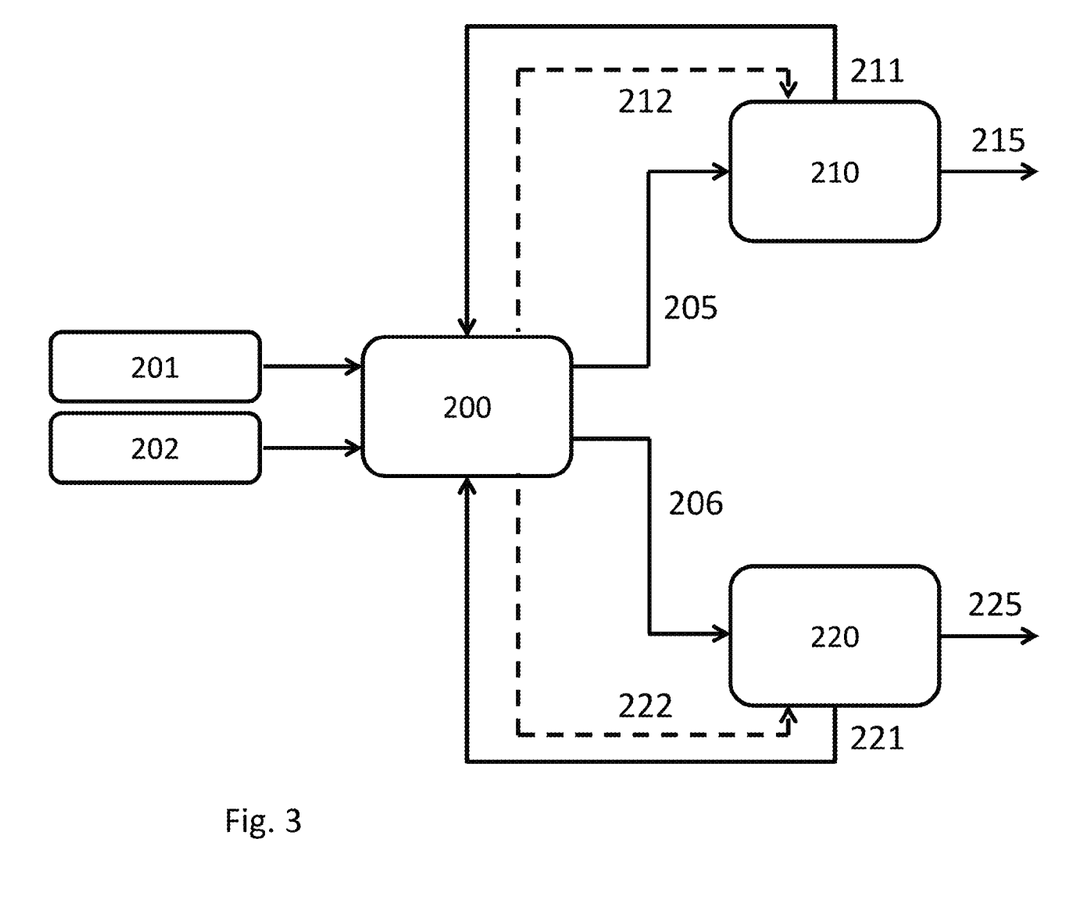
FIG. 3 illustrates a portion of a network architecture using the network element of FIG. 2.

Referring next to FIG. 3, there is illustrated a portion of a network architecture using the network elements of FIG. 2. This network architecture comprises: a coordinator 200; GERAN traffic request input 201; LTE traffic request input 202; a GERAN scheduler 210; and an LTE scheduler 220. A Base Station Controller (BSC, not shown) is the controller for GERAN (GSM and GPRS) technology, whilst a Base Transceiver Station (BTS, not shown) facilitates communication with mobile devices and is controlled by the BSC. An eNodeB is the equivalent to the BSC and BTS in the LTE RAN. Most (and probably all) of the components shown in FIG. 3 are located in one of the BSC, BTS and eNodeB.

The GERAN traffic request input 201 provides requests for GPRS packet and voice call traffic and the LTE traffic request input 202 provides requests for LTE traffic. Using these inputs, the coordinator 200 determines resources reserved for GERAN 205, which are indicated to the GERAN scheduler 210 and resources reserved for LTE 206, which are indicated to the LTE scheduler 220. The coordinator 200 also determines a transmission priority for each packet for GERAN 212, which is indicated to the GERAN scheduler 210 and a transmission priority for each packet for LTE 222, which is indicated to the LTE scheduler 220.

Thus, the coordinator 200 is an entity with knowledge of the traffic requests from the 2 (or more) systems and the current occupancy of the queues of the schedulers. It is also aware of the resources used for speech traffic (especially for GERAN). Then, it can periodically (for instance, every 20 ms, or 100 ms) make an assignment of resources to each scheduler, whilst communicating the priority (or alternatively, directly the application-type indication) for the transmission of the packets by each scheduler. This way, it can aim to guarantee that GSM speech packets are always transmitted (to meet QoS requirements), that on-going GSM calls maintain use of the same time-slot frequencies assigned and that other high priority LTE traffic (for instance, voice over LTE calls) also receive high priority treatment.

The GERAN scheduler 210 also provides the coordinator 200 with the current resource occupancy and information about queued traffic (packets) for the GERAN 211 to the coordinator. Similarly, the LTE scheduler 220 provides the coordinator 200 with the current resource occupancy and information about queued traffic (packets) for the LTE RAN 221 to the coordinator. These are also used by the coordinator 200 in determining the resource allocation, in particular which radio resource blocks are available for the scheduler of the other system.

The GERAN scheduler comprises a GPRS traffic radio resource management (RRM) block for assigning packets to specific radio resources (frequency and time) based on the GERAN allocation 205 received from the coordinator 200. The assignment is provided as a GERAN output 215. Similarly, the LTE scheduler 220 receives the LTE allocation of resources 206 from the coordinator 200 and, using this (together with interference measurements and/or the information regarding the priority of the LTE packets 222), it assigns packets to specific radio resources (frequency and time) and provides this as an LTE output 225.

Optionally, a signalling block may comprise a GSM signalling block, which identifies the broadcast control channel (BCCH) and signalling channels. The BCCH is the pilot channel for the GSM RAN. An LTE signalling block may identifies the LTE signalling channels. The signalling may be passed to the GERAN scheduler 210 and the LTE scheduler 220.

The coordination process shown in FIG. 3 can take place in response to a specific event (such as a new call or a new user) or may occur periodically.

To implement the configuration shown in FIG. 3, some software modifications may be made the eNodeB to allow it to shape its own traffic based on existing information from the BSC. Optionally, the BSC could also be modified to provide further efficiency improvements (to adapt traffic based on an understanding of LTE traffic).

The inter-operation of the LTE scheduler 220 and BSC RRM (GERAN scheduler 210) will now be discussed for one possible implementation in accordance with FIG. 3. These elements are configured to schedule traffic in the following way.

1) Signalling Channels and Basic Information. Signalling channels are allocated to different frequencies than traffic and are taken in account in the schedulers.

a. The LTE scheduler 220 does not schedule traffic into GSM carriers occupied by GSM BCCH (200 KHz per cell).

b. GSM calls are not assigned to LTE spectrum occupied by LTE common channels that are grouped in frequency.

2) Traffic Channels.

a. Traffic channel frequencies are fully shared and can be utilised by both LTE and GSM.

b. Voice traffic has priority over PS traffic (because interrupted voice traffic is more noticeable to users). This is achieved by the scheduler identifying the services being used (for example, using DPI), and using operational parameters set by the network operator, so that:

i. GSM voice traffic has priority over LTE PS traffic to use the shared frequencies (the GSM Voice Traffic allocation block 220 allocates frequencies and/or timeslots for voice calls with high priority); and      ii. Voice over LTE (VoLTE) traffic or Video over IP over LTE has priority over GSM PS traffic in order to use the shared frequencies (GSM PS traffic may have equal, lower or higher priority than LTE PS traffic, configurable by the operator).

c. Priorities of PS traffic are taken into account.

This is mostly effected by the GPRS traffic RRM block 210 and LTE scheduler 250. The GPRS traffic RRM block 210 allocates the GPRS PS traffic taking into account the voice traffic being used and also the LTE resources used. The following considerations apply:

i. some resources are reserved for GPRS traffic and then the rest is dynamically allocated;

ii. if GPRS PS traffic has lower priority than LTE PS traffic, then the GERAN scheduler 210 will take into account the resources used in the LTE or GSM RAN and allocate the free timeslots and/or frequencies to the GPRS calls;

iii. if GPRS PS traffic has a higher priority than the LTE PS traffic, then GPRS RRM will allocate the maximum possible timeslots and/or frequencies after the voice GSM and VoLTE or Video LTE resources; and    iv. if GPRS PS traffic has the same priority as the LTE PS traffic, a different algorithm for load sharing can be used to distribute the resources among the GERAN scheduler 210 and LTE Scheduler 220 for non-Guaranteed Bit Rate (GBR) services (this is performed by the Coordinator 200 which allocates the resources based on the customer priority or applications used or resources or throughput).

Similar considerations apply to the LTE scheduler 250. There, the following considerations are taken into account:

i. resources guaranteed for VoLTE and Video over LTE (GBR traffic) are allocated first and anything remaining is dedicated to non-GBR traffic;

ii. if GPRS PS traffic has higher priority than LTE PS traffic, then the LTE scheduler 220 will take into account the resources used in the GSM/GPRS RAN and allocates the free timeslots and/or frequencies to the LTE non-GBR packets;

iii. if GPRS PS traffic has lower priority than LTE PS traffic, then the LTE scheduler 250 will allocate the maximum possible timeslots and/or frequencies to these after the voice GSM and VoLTE or Video LTE resources; and    iv. if GPRS PS traffic has the same priority as the LTE PS traffic, a different algorithm for load sharing can be used to distribute the resources among the GERAN scheduler 210 and LTE Scheduler 220 for non-Guaranteed Bit Rate (GBR) services (this is performed by the coordinator 200 which allocates the resources based on the customer priority or applications used or resources or throughput).

3) Intelligent Schedulers self-adapt and minimize interference across systems. The LTE scheduler 220 can use standard techniques to detect the most interfered frequencies in the Uplink (by measuring the received Uplink power) and minimizing the usage of these frequencies.

The coordinator 200 can check the number of users with packets to be transmitted at each event and/or periodically. It can then distribute the resources according to a range or criteria, which may include the following:

1. technology (that is, RAT, such as GPRS or LTE)—in GPRS, timeslots can typically be allocated from 0 to 4 slots per user, whereas in LTE, all the packets are queued in the scheduler every Transmission Time Interval (TTI, such as 1 ms) and there is a relative weight which gives the probability of getting resources for every user—the coordinator 100 may allocate the number of frequencies used in LTE to be used by the LTE scheduler 220;

2. application—detected by a DPI function or by an indication from the Core Network, so that for example, if a high priority application is detected, higher priority can be given to these packets (5 slots allocated in GPRS and high weight in LTE) and for low priority applications (such as peer-to-peer, p2p), 0 or 1 slots can be allocated in GPRS, and a low weight used for the LTE scheduler; and 3. subscriber priority—which may be defined by the Home Location Register (HLR) customer profile—in GPRS, the parameters in the 3GPP Standards are given the table below (UMTS QoS Parameters, from 3GPP TS 23.203), but for LTE the QoS Class Identifier (QCI) is used; the number of slots and LTE scheduler weight can be a function of the QoS parameters in a similar way to the application priority.

| | UMTS QoS parameters | | | |
|---|---|---|---|---|
| GPRS QCI value | Traffic Class | THP | Signalling Indication | Source Statistics Descriptor |
| 1 | Conversational | n/a | n/a | speech (NOTE 1) |
| 2 | Conversational | n/a | n/a | unknown |
| 3 | Streaming | n/a | n/a | speech (NOTE 1) |
| 4 | Streaming | n/a | n/a | unknown |
| 5 | Interactive | 1 | Yes | n/a |
| 6 | Interactive | 1 | No | n/a |
| 7 | Interactive | 2 | No | n/a |
| 8 | Interactive | 3 | No | n/a |
| 9 | Background | n/a | n/a | n/a |

(NOTE 1):
The operator's configuration should reserve QCI values that map to "speech" for service data flows consisting of speech (and the associated RTCP) only.

FIGS. 2 and 3 show a generic approach to sharing knowledge of resource utilization. More details are now provided in respect of this aspect. Three possible ways to implement the reporting of the used frequencies and load from one system to the other are considered.

1) BSC to eNodeB communication. The BSC can inform the eNodeB with a new proprietary message (optionally through a new proprietary interface) to the eNodeB and vice versa.

2) BTS to eNodeB communication. This has two options: same site—the BTS can promptly inform the eNodeB on the used GSM frequencies and time slot used (this should require minimal modifications as the components are usually in the same box); and inter-site— information is conveyed with a message from one site to the other using standard techniques for adding a new proprietary interface, or extra signalling through the normal Transport network.

3) Mixed: a combination of the above two methods.

Selecting the most appropriate method for reporting from the list above depends on the vendor architecture at each site, and their specific implementation requirements. Solution 2 (BTS) would only be suitable for simple implementations (e.g. just speech for 2G traffic); more complicated 2G requirements would need BSC modifications.

Figure 4A:
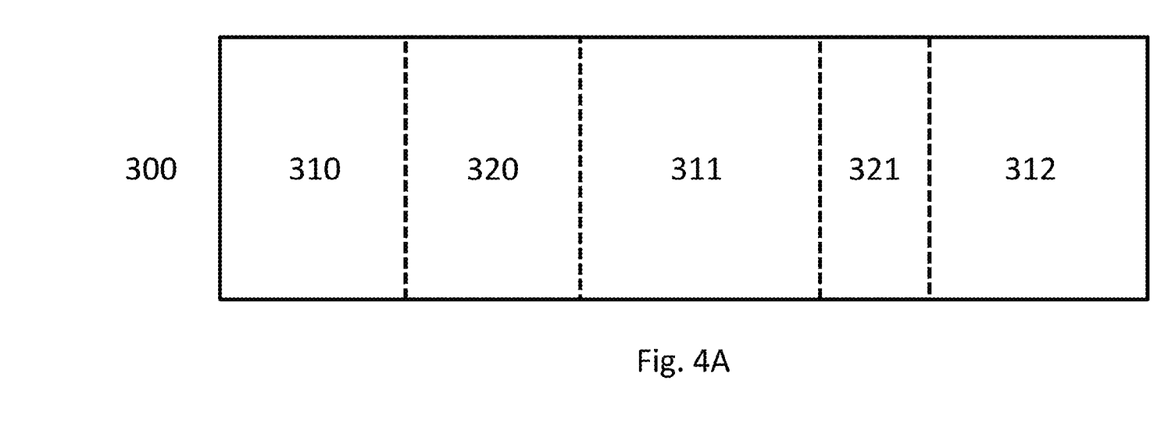
FIG. 4A schematically depicts an example allocation of bandwidth between different Radio Access Networks at a first time.

Referring next to FIG. 4A, there is shown a schematic depiction of an example allocation of bandwidth 300 between different RANs at a first time (or more specifically, during a first time period). The bandwidth 300 has been allocated on the basis of the coordinator 200, GERAN scheduler 210 and LTE scheduler 220. Bandwidth 300 is allocated to comprise: a first LTE bandwidth segment 310; a second LTE bandwidth segment 311; a third LTE bandwidth segment 312; a first GERAN bandwidth segment 320; and a second GERAN bandwidth segment 321.

The first LTE bandwidth segment 310 may be dedicated for Voice over LTE (VoLTE). Similarly, the first GERAN bandwidth segment 320 may be dedicated to GSM speech (voice). The second LTE bandwidth segment 311 and the third LTE bandwidth segment 312 may be used for other types of traffic.

Figure 4B:
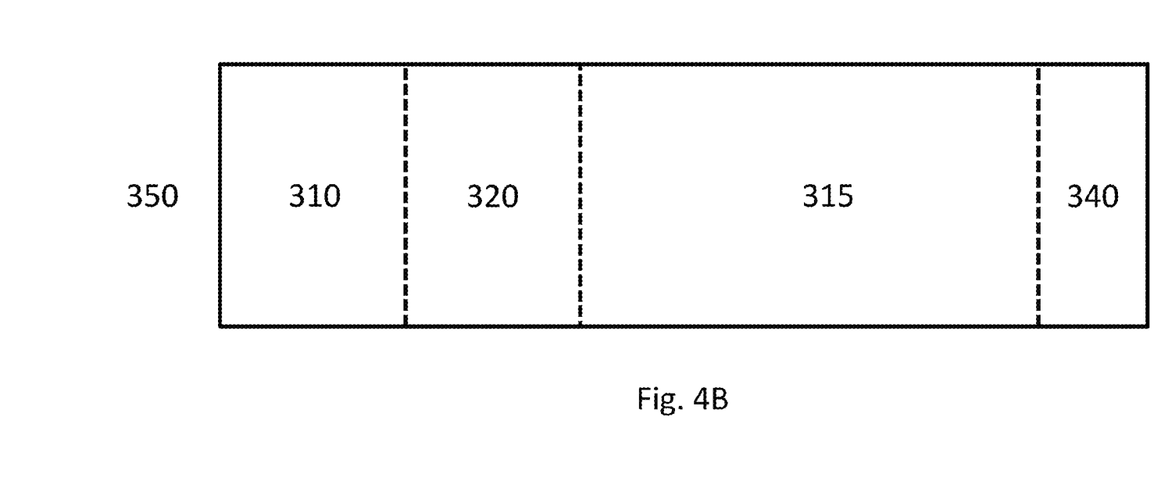
FIG. 4B schematically depicts the example allocation of bandwidth of FIG. 4A at a second time.

At a second time, the allocation of the same bandwidth may be different, due to different traffic having different priorities and, possibly due to different radio conditions. Referring next to FIG. 4B, there is shown a schematic depiction of the example allocation of bandwidth of FIG. 4A at the second time (or second time period). Some of the bandwidth segments allocated in the bandwidth 350 remain the same, specifically, the first LTE bandwidth segment 310 (again, assigned to VoLTE) and the first GERAN bandwidth segment 320 (for GSM speech). However, the allocation of the other bandwidth segments is different. A new second GERAN bandwidth segment 340 is provided for GPRS packet traffic. The remaining portion of the bandwidth is allocated as a new second LTE bandwidth segment 315.

Figure 5A:
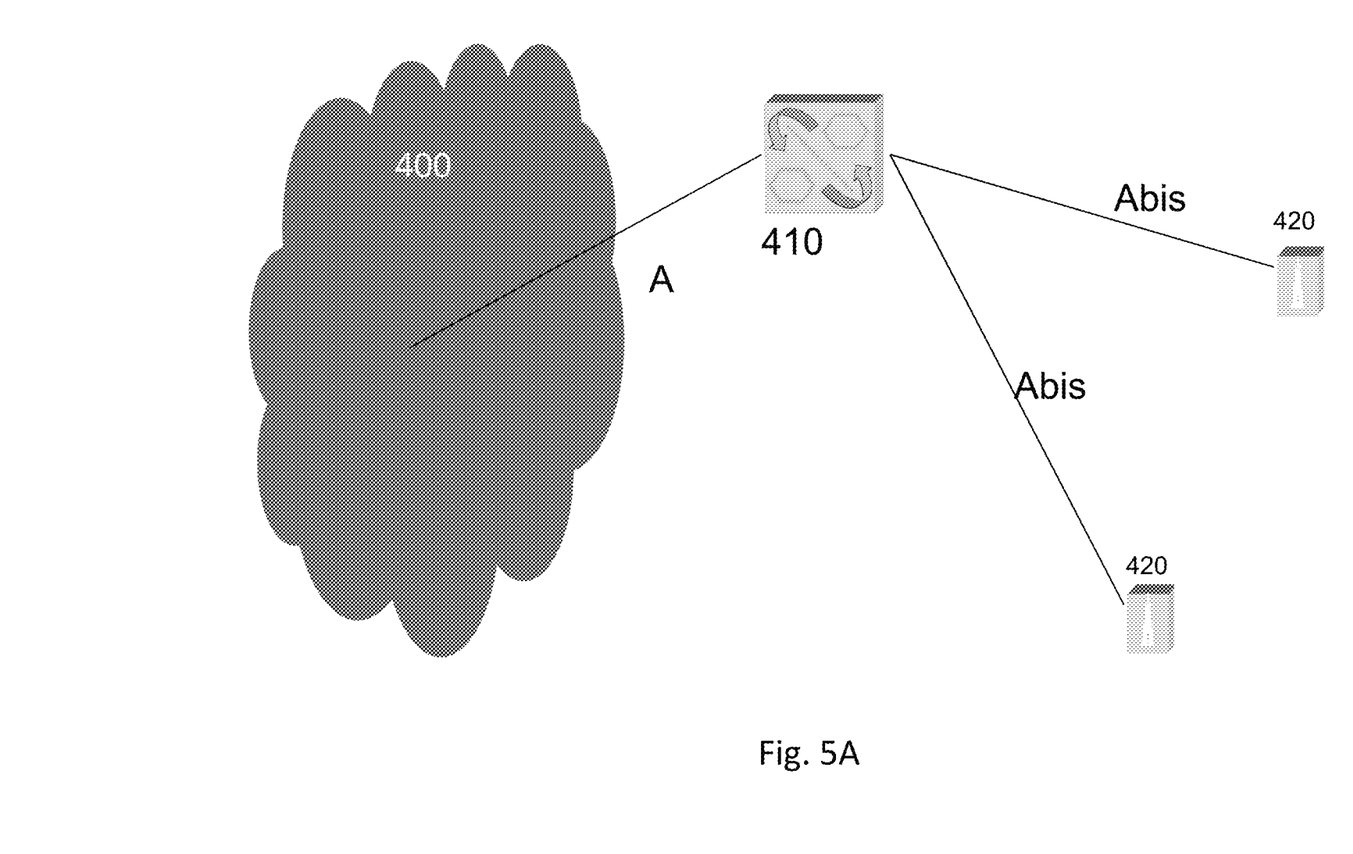
FIG. 5A shows an existing network architecture for GERAN.

FIG. 5A shows an existing network architecture for GERAN. There is an interface A between the core network 400 and the base station controller 410. Moreover, an interface Abis is also provided between the BSC 410 and the BTS 420.

Figure 5B:
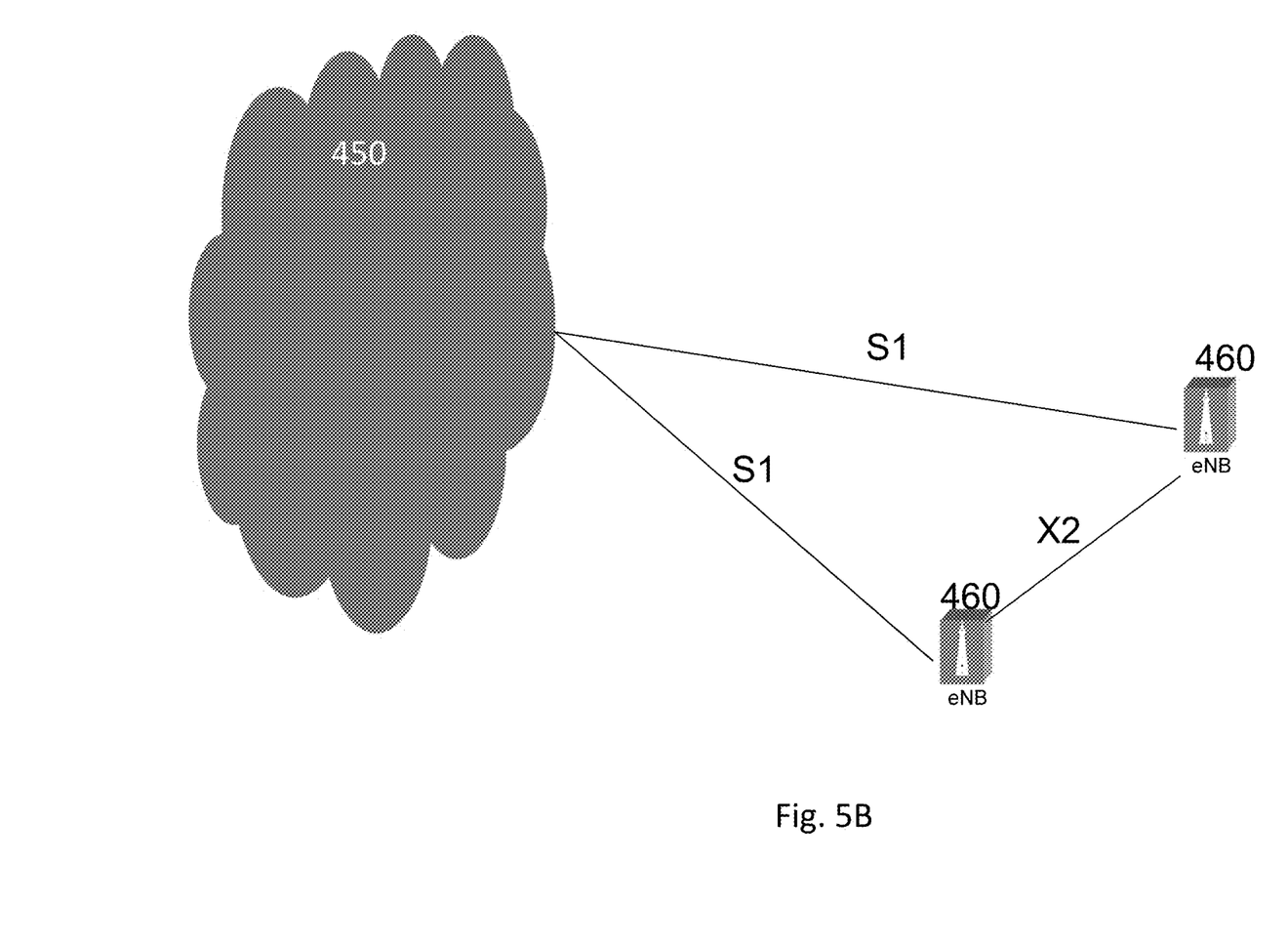
FIG. 5B shows an existing network architecture for LTE.

FIG. 5B shows an existing network architecture for LTE. An interface S1 is provided between the core network 450 and the eNodeB 460. Moreover, an interface X2 is provided between respective eNodeBs 460. This network architecture may be modified to incorporate the network architecture shown in FIG. 3.

Figure 6:
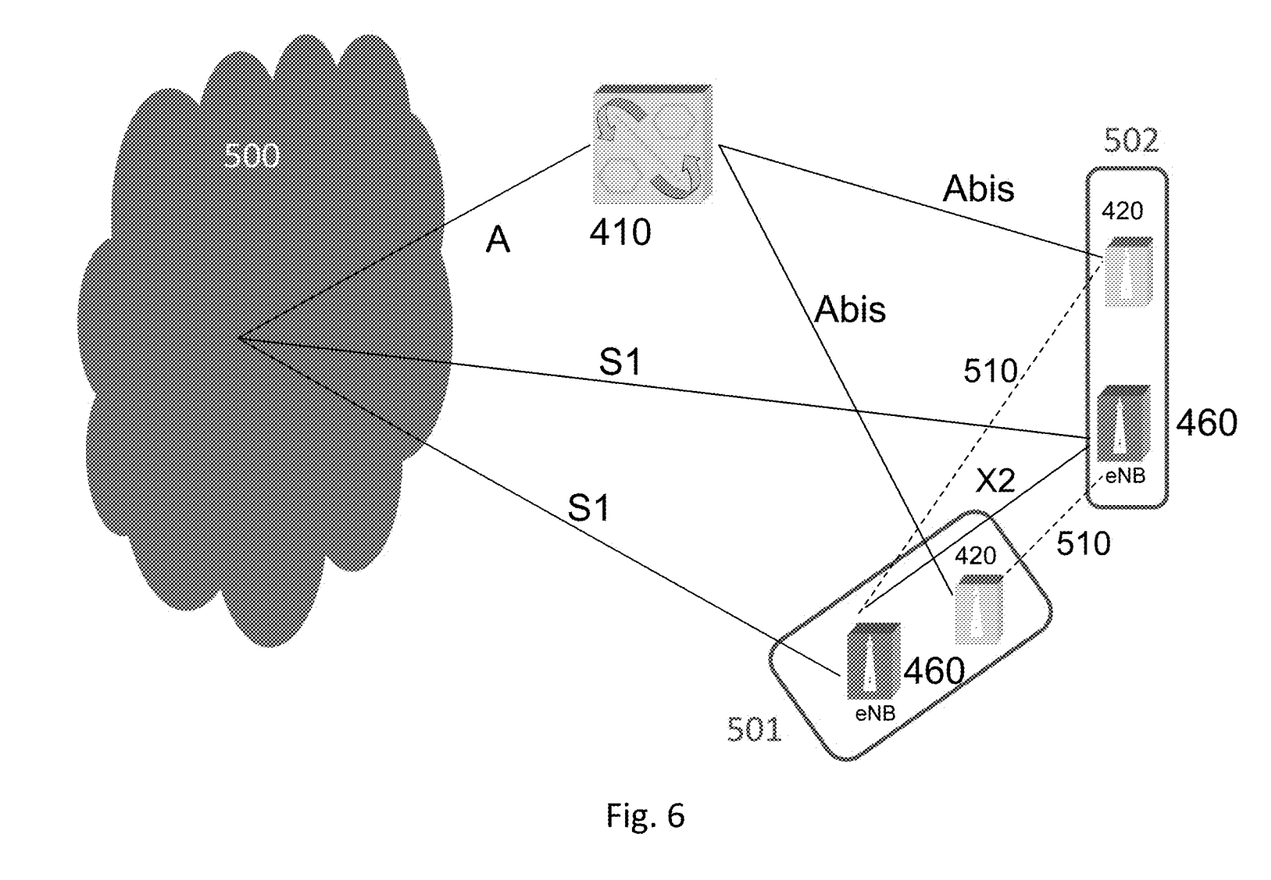
FIG. 6 illustrates a first approach for modifying the network architectures shown in FIGS. 5A and 5B in accordance with the present invention.

Referring next to FIG. 6, there is illustrated a first approach for modifying the network architectures shown in FIGS. 5A and 5B in accordance with the present invention. The interface A is provided between the core network 400 and the BSC 410 and the interface Abis is provided between the BSC 410 and the BTS 420. Moreover, the interface S1 is provided between the core network 400 and the eNodeB 460 and the interface X2 is provided between eNodeBs 460. A new interface 510 is also provided. This interface 510 is between BTS 420 and eNodeB 460. This new interface 510 allows the exchange of assignment information 231, 241, 271 shown in FIG. 3.

Figure 7:
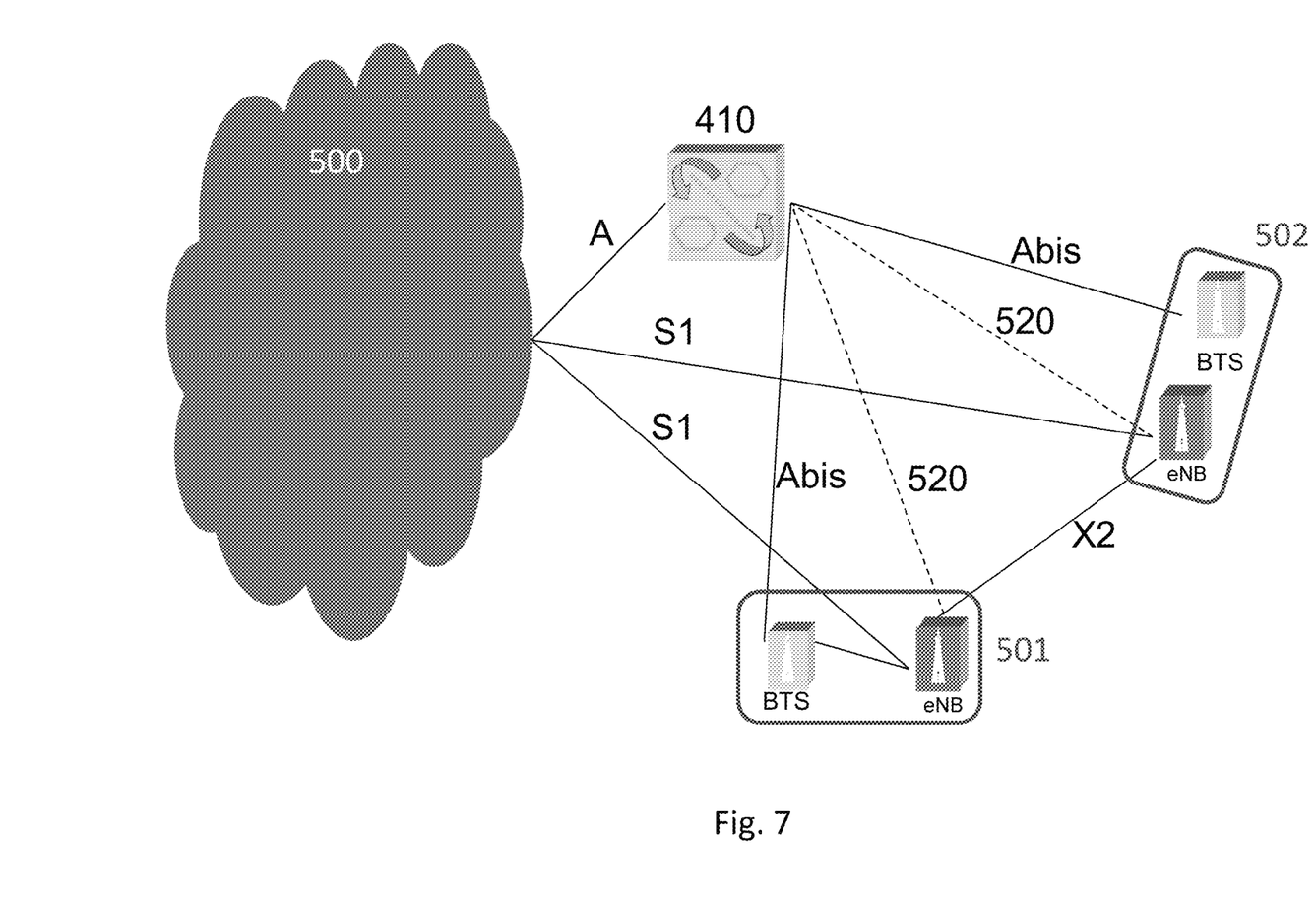
FIG. 7 illustrates a second approach for modifying the network architectures shown in FIGS. 5A and 5B in accordance with the present invention.

Referring now to FIG. 7, there is illustrated a second approach for modifying the network architectures shown in FIGS. 5A and 5B in accordance with the present invention.

A different new interface 520 is provided. This new interface 520 is provided between the BSC 410 and the eNodeB 520.

The invention claimed is:

1. A network element for coordinating use of radio resources between a first Radio Access Network (RAN) and a second RAN, wherein each RAN is configured to communicate over a same predefined bandwidth range, the network element comprising:
   logic, arranged to determine a first priority associated with a first traffic to be carried over the first RAN and to determine a second priority associated with a second traffic to be carried over the second RAN and further arranged to assign to the first RAN a first portion of the radio resources comprising one or more first bandwidth segments and to assign to the second RAN a second portion of the radio resources comprising a plurality of second bandwidth segments, the assignment of the first and second portions being based on the first and second priorities, wherein the assignment of the first and second portions are performed at specific intervals that are defined by certain detected events, the detected events at least comprising detection of a new call or detection of a new user; and
   an output, configured to communicate an indication of the first portion to a scheduler of the first RAN and/or to communicate an indication of the second portion to a scheduler of the second RAN;
   wherein the logic is arranged to assign at least one of the one or more first bandwidth segments between two of the plurality of second bandwidth segments.

2. The network element of claim 1, wherein the one or more first bandwidth segments are included within a first plurality of bandwidth segments, and wherein the logic is arranged to assign the first plurality of bandwidth segments to interleave between the second plurality of bandwidth segments.

3. The network element of claim 1, wherein the first priority and the second priority are determined on a basis of one or more of:
   whether the respective traffic is Circuit Switched (CS) or Packet Switched (PS);
   an application for which the respective traffic is intended;
   a priority allocated to a mobile subscriber to which the respective traffic relates;
   one or more Quality of Service (QoS) parameters of the respective traffic;
   a Traffic Class of the respective traffic; and
   what Radio Access Technology (RAT) is used by the RAN for communication of the respective traffic.

4. The network element of claim 3, wherein the application for which the respective traffic is intended or the traffic class of the respective traffic is determined by a Deep Packet Inspection (DPI) of the respective traffic.

5. The network element of claim 3, wherein the application for which the respective traffic is intended may comprise one or more of: voice, video, peer-to-peer data, and hypertext transfer protocol (HTT), and wherein traffic intended for voice or video applications has a higher priority than traffic intended for peer-to-peer data or HTTP applications.

6. The network element of claim 3, wherein the Traffic Class of the respective traffic comprises one or more of: background, interactive, streaming, and conversational, and wherein traffic having a streaming or conversational Traffic Class has a higher priority than traffic having a background or interactive Traffic Class.

7. The network element of claim 1, wherein the logic is further arranged to determine a load on the first RAN and a load on the second RAN and to assign the first and second portions of the bandwidth based on the load on the first RAN and the load on the second RAN.

8. The network element of claim 7, wherein the determined load on the first RAN relates only to the first traffic and wherein the determined load on the second RAN relates only to the second traffic.

9. The network element of claim 1, wherein the output is configured to communicate the indication of the first and/or second portions of the radio resources using an interface between a first network entity associated with the first RAN and a second network entity associated with the second RAN.

10. The network element of claim 9, wherein the first network entity is an eNodeB and wherein the second network entity is a Base Station Controller (BSC) or a Base Transceiver Station (BTS).

11. The network element of claim 1, wherein the first RAN is a Long Term Evolution (LTE) network and the second RAN is GSM or GPRS network.

12. The network element of claim 1, wherein the first RAN and the second RAN are associated with the same network operator.

13. The network element of claim 1, wherein the network element forms part of the first RAN or part of the second RAN.

14. The network element of claim 13, wherein the network element is the scheduler of the first RAN or the scheduler of the second RAN.

15. A method for coordinating use of radio resources between a first Radio Access Network (RAN) and a second RAN, wherein each RAN is configured to communicate over a same predefined bandwidth range, the method comprising:
   determining a first priority associated with a first traffic to be carried over the first RAN;
   determining a second priority associated with a second traffic to be carried over the second RAN;
   assigning to the first RAN a first portion of the radio resources comprising one or more first bandwidth segments that are based on the first and second priorities;
   assigning to the second RAN a second portion of the radio resources comprising a plurality of second bandwidth segments that are also based on the first and second priorities; and
   communicating an indication of the first portion to a scheduler of the first RAN and/or an indication of the second portion to a scheduler of the second RAN; and
   wherein at least one of the one or more first bandwidth segments is assigned between two of the plurality of second bandwidth segments, and
   wherein the assignment of the first and second portions are performed at specific intervals that are defined by certain detected events, the detected events at least comprising detection of a new call or detection of a new user.

16. The method of claim 15, wherein the first portion and the second portion of the radio resources sum together to comprise only a fraction of a total available resources.

17. The method of claim 15, wherein at least some of the one or more first bandwidth segments are unoccupied even though the at least some of the one or more first bandwidth segments are assigned to the first RAN.

* * * * *